United States Patent
Dennert

(10) Patent No.: US 9,758,419 B2
(45) Date of Patent: Sep. 12, 2017

(54) METHOD AND INSTALLATION FOR PRODUCING HOLLOW MICROBEADS OF GLASS

(71) Applicant: DENNERT PORAVER GMBH, Postbauer-Heng (DE)

(72) Inventor: Hans Veit Dennert, Schluesselfeld (DE)

(73) Assignee: Dennert Poraver GmbH, Postbauer-Heng (DE)

( * ) Notice: Subject to any disclaimer, the term of this patent is extended or adjusted under 35 U.S.C. 154(b) by 12 days.

(21) Appl. No.: 15/011,908

(22) Filed: Feb. 1, 2016

(65) Prior Publication Data

US 2016/0221856 A1 Aug. 4, 2016

(30) Foreign Application Priority Data

Jan. 30, 2015 (DE) .......................... 10 2015 201 681

(51) Int. Cl.
  *C03B 19/10* (2006.01)
(52) U.S. Cl.
  CPC .......... *C03B 19/107* (2013.01); *C03B 19/109* (2013.01); *C03B 19/1075* (2013.01)
(58) Field of Classification Search
  CPC .... C03B 19/10; C03B 19/107; C03B 19/1075
  See application file for complete search history.

(56) References Cited

U.S. PATENT DOCUMENTS

| | | | |
|---|---|---|---|
| 2,431,884 A | 12/1947 | Neuschotz | |
| 2,978,339 A * | 4/1961 | Veatch et al. | C03B 19/107 23/313 AS |
| 3,230,064 A | 1/1966 | Veatch et al. | |
| 3,838,998 A * | 10/1974 | Matthews | C03C 11/002 501/29 |
| 5,611,833 A | 3/1997 | Brahmbhatt et al. | |
| 2007/0231500 A1* | 10/2007 | Rakotoarison | C01B 3/001 427/462 |

FOREIGN PATENT DOCUMENTS

DE     3521520 A1    12/1986

* cited by examiner

*Primary Examiner* — Cynthia Szewczyk
(74) *Attorney, Agent, or Firm* — Laurence A. Greenberg; Werner H. Stemer; Ralph E. Locher

(57) ABSTRACT

Hollow microbeads of glass are produced during a number of operating phases in which an upwardly directed hot gas flow is produced in a firing chamber by firing a vertical furnace. The firing chamber is continuously charged with microparticles of a starting glass material and the microparticles are expanded in the hot gas flow into the hollow microbeads. Expanded hollow microbeads are discharged out of the firing chamber with the gas flow through a gas outlet at the upper end of the vertical furnace. Between successive operating phases there is respectively provided a charging break, during which the charging of the firing chamber with the microparticles is suspended. In these charging breaks, the microparticles remaining in the firing chamber are respectively removed from the firing chamber.

12 Claims, 5 Drawing Sheets

METHOD AND INSTALLATION FOR PRODUCING HOLLOW MICROBEADS OF GLASS

CROSS-REFERENCE TO RELATED APPLICATION

This application claims the priority, under 35 U.S.C. §119, of German patent application DE 10 2015 201 681.1, filed Jan. 30, 2015; the prior application is herewith incorporated by reference in its entirety.

BACKGROUND OF THE INVENTION

Field of the Invention

The invention relates to a method for producing hollow microbeads of glass. The invention also relates to an installation for carrying out the method.

Hollow microbeads of glass, that is to say hollow beads with a glass wall and typical diameters in the submillimeter range (about 1 µm to 1000 µm), are often used as lightweight additives in composite materials and lightweight concrete. Furthermore, among other applications, these hollow microbeads—also referred to as "microspheres" or "glass microspheres"—are used in medicine and the consumer goods industry.

A method for producing such hollow microbeads is known for example from U.S. Pat. No. 3,230,064. The prior art specifies a vertical furnace for producing the hollow microbeads. The vertical furnace has a firing chamber with an upwardly directed hot gas flow that is produced by way of a burner. Firing material consisting of microparticles mixed with a blowing agent is introduced into the firing chamber of this vertical furnace. The microparticles are melted in the hot gas flow. Furthermore, gas is produced in the molten microparticles by the blowing agent, with the effect of inflating (expanding) the microparticles into the desired hollow microbeads. On account of their reduced density, the hollow microbeads float up in the gas flow and are discharged out of the firing chamber with the gas flow through a gas outlet arranged at the upper end of the vertical furnace. The discharged hollow microbeads are separated from the gas flow in a cyclone separator or a bag filter arranged downstream in the vertical furnace. Furthermore, the vertical furnace is also provided on the underside of the firing chamber with an outlet opening, by way of which products collecting on the bottom of the firing chamber can be drawn off from the firing chamber.

However, the use of vertical furnaces of the type described above involves considerable difficulties, especially for the production of hollow microbeads of glass. This is in particular because, in comparison with other expandable raw materials, such as for example perlites, microparticles can only expand to a relatively small extent. In other words, the decrease in apparent density involved in the expansion is far less pronounced in the production of hollow microbeads than for example in the case of perlites. On account of this effect, it is extremely difficult in the production of hollow microbeads of glass to control the flow velocity in the vertical furnace in such a way that only hollow microbeads with a desired apparent density are discharged along with the furnace off-gases. Rather, it is unavoidable that some proportion or other of the firing material remains in the firing chamber of the vertical furnace. In the continuous operation of the firing furnace, this proportion steadily becomes greater, whereby the output and effectiveness of the vertical furnace is increasingly impaired. Furthermore, there is a comparatively high risk of the microparticles that are not discharged sticking to one another or to the wall of the firing chamber.

SUMMARY OF THE INVENTION

It is accordingly an object of the invention to provide a method and installation for producing glass microbeads which overcome the above-mentioned and other disadvantages of the heretofore-known devices and methods of this general type and which provide for an effective method and an installation that can be operated effectively for producing hollow microbeads of glass.

With the foregoing and other objects in view there is provided, in accordance with the invention, a method for producing hollow microbeads of glass, the method comprising:

during each of a plurality of operating phases:
producing an upwardly directed hot gas flow in a vertical furnace by firing in a firing chamber of the vertical furnace;
continuously charging the firing chamber with microparticles of a starting glass material;
expanding the microparticles in the hot gas flow to form the hollow microbeads; and
discharging expanded hollow microbeads out of the firing chamber with the gas flow through a gas outlet at an upper end of the vertical furnace; and
providing a charging break between mutually successive operating phases, and during the charging break:
suspending the charging of the microparticles into the firing chamber; and
removing the microparticles remaining in the firing chamber from the firing chamber.

According to the invention, an upwardly directed, hot gas flow is produced—in what is in fact a conventional way—by firing in a firing chamber of a vertical furnace. The firing chamber of the vertical furnace is charged with microparticles, so that the microparticles are expanded in the hot gas flow into the desired hollow microbeads, at least a large proportion of the hollow microbeads thus produced being discharged out of the firing chamber with the gas flow through a gas outlet at an upper end of the vertical furnace. The microparticles used as the starting product for producing the hollow microbeads consist of a glass material—in particular a ground glass material—the chemical composition of which may differ slightly from the composition of the glass of the finished hollow microbeads because of the chemical processes occurring in the vertical furnace, and is therefore referred to as the "starting glass material." The gas flow produced in the firing chamber is preferably made up only of outside air and combustion gases of the firing process. However, it is conceivable within the scope of the invention that the chemical composition of the gas flow is deliberately influenced by admixing reaction gases (for example reducing or oxidizing reaction gases) or inert gases.

Unlike in the case of conventional methods, the method sequence described above is not however carried out continuously, but only quasi-continuously in a number of successive operating phases, between which a charging break is respectively provided. Therefore, it is only during the operating phases that the firing chamber of the vertical furnace is continuously charged with the microparticles to be expanded. During the charging breaks, on the other hand, the charging of the firing chamber with the microparticles is in each case suspended. The microparticles remaining in the firing chamber at the end of each operating phase (generally an inhomogeneous mixture of non-expanded microparticles, partly expanded microparticles and degassed (burst) microparticles) are hereby respectively removed from the firing chamber during the charging break following the operating phase.

The duration of the operating phases is in this case preferably set in such a way that the emptying of the firing chamber always takes place already before the operation of the furnace is significantly impaired by the microparticles collecting therein. Thus, in an advantageous refinement of the method, the duration of each operating phase approximately lies in particular between 4 min and 30 min.

In accordance with an added feature of the invention, the microparticles remaining in the firing chamber are removed by way of the underside of the firing chamber. For this purpose, during the charging breaks the gas flow is in each case reduced (in particular stopped entirely) in such a way that the glass particles remaining in the firing chamber sink to the bottom of the firing chamber, where they are removed through an outlet opening provided in the bottom of the firing chamber.

In accordance with an alternative feature of the invention, the microparticles remaining in the firing chamber are removed by way of the upper end of the vertical furnace. For this purpose, during the charging breaks the gas flow is in each case increased by blowing in cold gas (in particular outside air) in such a way that the microparticles remaining in the firing chamber are blown out from the firing chamber by way of the gas outlet at the upper end of the vertical furnace.

In both variants of the invention described above, during the charging breaks the temperature of the gas flow is preferably lowered in each case before the reduction or increase in the gas flow by introducing cold gas. In particular, the burner output of the burner firing the firing chamber is lowered to zero or a low value at the end of each operating phase, the resultant loss in flow-producing output being compensated exactly, or at least approximately, by (possibly increased) blowing in of cold gas. As a result, in a cooling-down phase directly following the preceding operating phase in each case, the microparticles remaining in the firing chamber are advantageously first kept in suspension, until they have cooled down sufficiently to avoid or at least reduce the sticking of the microparticles to one another and/or to the inside wall of the firing chamber. Only after this cooling-down phase is the gas flow in the firing chamber lowered or increased to remove the remaining microparticles in the way described above.

The method described above is preferably performed cyclically, so that operating phases and charging breaks follow one another in a regular cycle over time. In other words, the operating phases and the charging breaks are in each case performed with a fixed uniform duration. The charging breaks are preferably made here to be of a shorter—in particular much shorter—time than the operating phases. In other words, the operating phases preferably have a duration that exceeds—in particular by a multiple—the duration of the interim charging breaks. Thus, in a preferred setting of the method sequence, the operating phases are fixed to a uniform duration of between about 4 min and 30 min, while the interim charging breaks have a uniform duration of between about 5 seconds and 60 seconds.

With the above and other objects in view there is also provided, in accordance with the invention, an installation for producing hollow microbeads of glass, the installation comprising:

a vertical furnace having a firing chamber with a gas outlet formed at an upper end thereof;

a burner disposed in said firing chamber and configured to produce an upwardly directed hot gas flow in said firing chamber;

a charging device for charging said firing chamber with microparticles of a starting glass material, whereupon the microparticles are expanded in the hot gas flow into the hollow microbeads, and the microbeads are discharged out of the firing chamber with the gas flow through the gas outlet; and a control unit configured to automatically carry out the method as described above.

In other words, the apparatus according to the invention comprises the vertical furnace with the firing chamber described above, a gas outlet being formed at an upper end of the firing chamber. The vertical furnace preferably also has at the bottom of the firing chamber an outlet opening for the removal of the microparticles remaining in the firing chamber. However, in the case of structural forms of the vertical furnace that are intended for emptying of the firing chamber by way of the gas outlet on the upper side, this outlet opening is not necessary, and is therefore preferably also not present.

Furthermore, the installation comprises a burner, which is arranged in the firing chamber and with which the upwardly directed hot gas flow can be produced in the firing chamber. The installation also comprises a charging device, by means of which the firing chamber can be charged with the microparticles to be expanded, so that the microparticles are expanded in the hot gas flow into the desired hollow microbeads, which are discharged out of the firing chamber with the gas flow through the gas outlet.

According to the invention, the installation finally comprises a control unit, which is designed for automatically carrying out the method according to the invention described above. The control unit consequently comprises switching or programming means by which, in its operation as intended, the control unit automatically carries out the method according to the invention described above by activating the burner, a cold-gas blower and/or other component parts of the installation.

The control unit is formed in particular by a control computer (computer) with control software to be executed by the computer. As an alternative to this, the control unit may however also be formed by a programmable circuit or a non-programmable circuit. For the activation of the burner, the charging unit and possibly further component parts of the installation, the control computer is connected to these parts of the installation by data transmission means (for example by a field bus).

In order to avoid, or at least largely reduce, sticking of the microparticles or hollow microbeads to the inside wall of the shaft furnace bounding the firing chamber, the inside wall of the vertical furnace is preferably formed from steel.

In order to reduce the sticking of microparticles to the inside wall still further, the inside wall is optionally cooled.

For this purpose, in an expedient refinement of the invention the vertical furnace is provided with a double furnace shell, which in addition to the inside wall comprises an outside wall surrounding the latter at a distance. Formed between the inside wall and the outside wall is an annular gap, which is also referred to as the "shell interspace".

Cooling air is passed through this gap—preferably in counter current in relation to the hot gas flow in the firing chamber, that is to say from the top downward. The cooling air heated up in such a way, for example to about 600° C., is drawn off from the space inside the shell and fed to the burner as combustion air or excess air, whereby the energy efficiency of the vertical furnace is increased considerably.

Other features which are considered as characteristic for the invention are set forth in the appended claims.

Although the invention is illustrated and described herein as embodied in a method and installation for producing hollow microbeads of glass, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
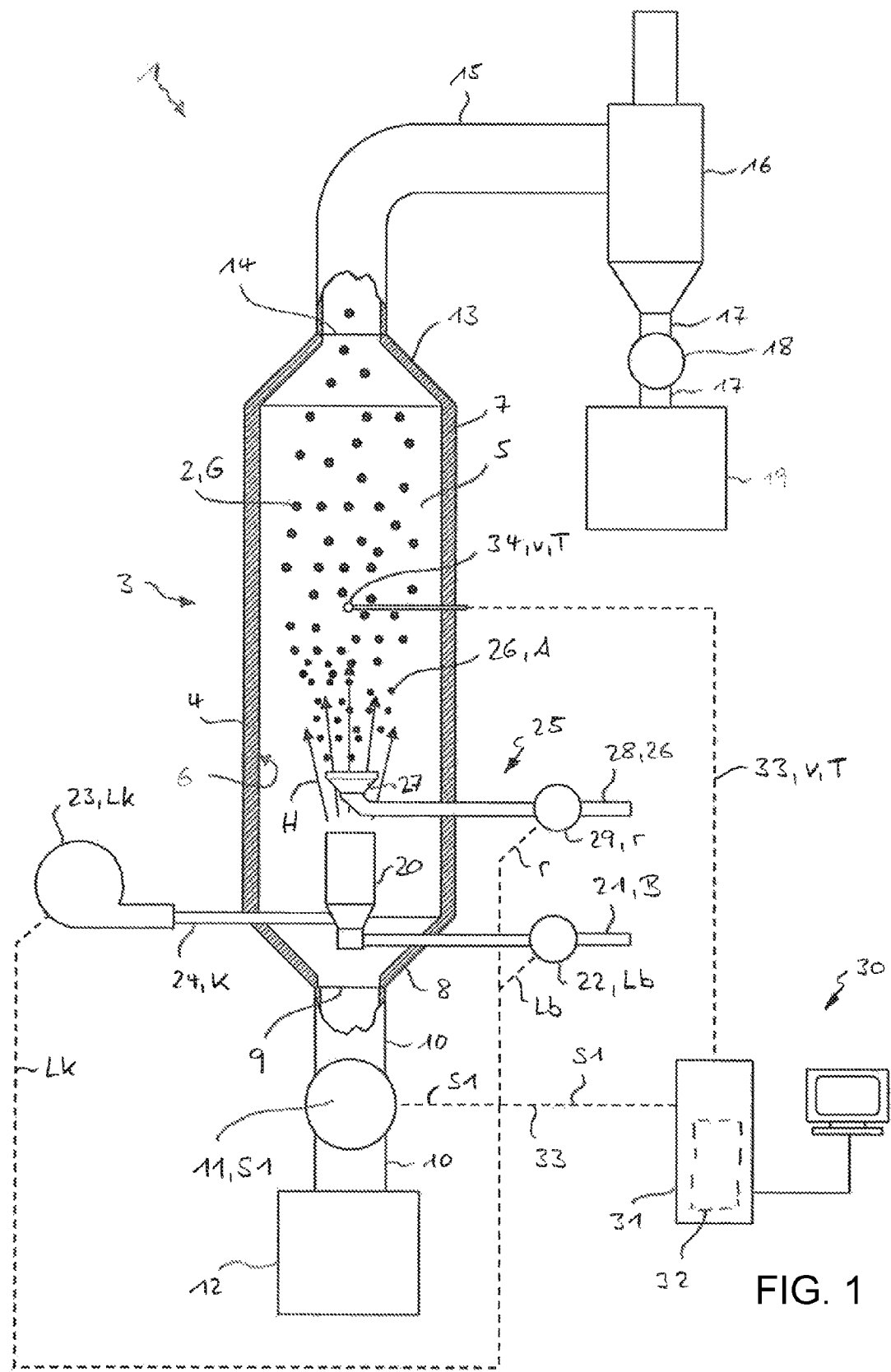
FIG. 1 is a highly schematic and simplified representation of an installation for producing hollow microbeads of glass with a vertical furnace, a hot gas flow in which introduced microparticles of a starting glass material are expanded into the desired hollow microbeads being produced in a firing chamber of the vertical furnace by means of a burner.

Referring now to the figures of the drawing in detail and first, particularly, to FIG. 1 thereof, there is shown, in highly schematic simplification, an installation 1 for producing hollow microbeads 2 of glass G. The central component part of the installation 1 is a vertical furnace 3 with a substantially hollow-cylindrical, peripheral (furnace) shell 4, which surrounds the firing chamber 5, which is elongated in the manner of a shaft and aligned vertically with regard to its longitudinal extent. In a preferred form of the vertical furnace 3, the shell 4 comprises an inside wall 6 of steel directly bounding the firing chamber 5 and a thermal insulation 7, provided on the outside of the inside wall 6. In an alternative configuration of the installation 1, the shell 4 may however also have a fiber insulation on the inside (i.e. directly adjacent the firing chamber 5), which is stabilized by a ramming compound.

At its lower end, the shell 4 is formed by a conical (frustoconical) bottom 8, which opens out into an outlet opening 9. This outlet opening 9 is adjoined by a reject line 10, which can be reversibly opened and closed by a reject valve 11. The reject line 10 opens out into a reject reservoir 12, which is formed for example by a silo or a container.

At its upper end, the shell 4 is closed off by a likewise frustoconical (alternatively curved) dome 13, which opens out into a gas outlet 14. The gas outlet 14 is adjoined by a pipeline referred to as a flue duct 15, which opens out into a solids separator 16. A lower end (solids outlet) of the solids separator 16, preferably formed as a cyclone separator, is adjoined by a product line 17, which is closed off by a product valve 18 in a pressure-tight manner, though allowing deposited products (that is to say hollow microbeads 2 produced) to pass through. The product valve 18 is formed for example in the form of a double swing valve or a rotary feeder. The product line 17 opens out into a product reservoir 19, which once again is formed for example by a silo or a container.

In a region of the vertical furnace 3 near the bottom, a burner 20 operated by a combustible gas B is arranged within the firing chamber 5. The combustible gas B is fed to the burner 20 by way of a combustible-gas line 21, in which a gas valve 22 is arranged to control the gas inflow. The burner output Lb can be variably set here by way of the gas valve 22.

On the other hand, the installation 1 comprises a (cold-gas) blower 23, in order to blow cold gas K (here by way of example outside air at ambient temperature) into the firing chamber 5. In the representation according to FIG. 1, the blower 23 is for this purpose connected to the burner 20 by way of a cold-gas line 24. The cold gas K is consequently blown into the burner 20. In alternative embodiments of the installation 1, the cold-gas line 24 opens out into cold-gas nozzles, which are arranged separately from the burner 20 in the lower part of the firing chamber 5.

Furthermore, the installation 1 comprises a charging device 25, with which microparticles 26 of a starting glass material A can be introduced into the firing chamber 5 as a starting product for the production of the hollow microbeads 2.

The charging device 25 comprises a output head 27, which is arranged above the burner 20 in the firing chamber 5 and by way of which the microparticles 26 are output into the firing chamber 5. The output head 27 is connected to a supply line 28, by way of which the microparticles 26 are transported into the firing chamber. Arranged in the supply line 28 is an actuating unit 29, by way of which the charging rate r can be set. Here, the charging rate r refers to the amount (weight or volume) of microparticles 26 output into the firing chamber 5 per unit of time. Optionally, the charging unit 25 comprises means for preheating the microparticles 26 to a temperature lying below the softening point of the starting glass material, for example to approximately 800° C. The microparticles 26 are thereby output into the firing chamber 5 in a correspondingly preheated state. A hot-air blower or an electrically heated supply line 28 are provided for example as means for preheating the microparticles 26.

Finally, the installation 1 comprises a control unit 30, which in the embodiment represented comprises a control computer 31 with a control program 32 to be executed by the computer. The control unit 30 serves for automatically controlling the installation 1 in its operation and for this purpose is connected, for example by way of an indicated fieldbus 33, to the outlet valve 11, the gas valve 22, the blower 23 and the actuating unit 29, in order to control these components of the installation automatically.

In the operation of the installation 1, the firing chamber 5 is fired by means of the burner 20. Produced as a result within the firing chamber 5 is an upwardly directed hot gas flow H, into which the microparticles 26 are output by means of the output head 27. As input variables for controlling the aforementioned components of the installation, measured values of the flow velocity v and the temperature T of the gas flow H, which are collected by the sensor unit 34 arranged in the firing chamber 5, are fed to the control unit 30 by way of the fieldbus 33.

The microparticles 26 are melted by the hot gas flow H, the microparticles 26 being inflated (expanded) into the desired hollow microbeads 2 by gas formation of a blowing agent contained in the starting glass material A. On account of their very much lower apparent density in comparison with the microparticles 26, the expanded hollow microbeads 2 are discharged out of the firing chamber 5 with the gas flow H through the gas outlet 14 and fed to the solids separator 16. Here, the hollow microbeads 2 are separated from the furnace offgases. While the offgas cleaned in such a way is output to the environment or passed on for further offgas treatment, the hollow microbeads 2 separated in the solids separator 16 are fed to the product reservoir 19 by way of the product line 17.

Essential boundary conditions for this process are the temperature T and the flow velocity v of the gas flow H produced in the firing chamber 5. Both parameters are set by the control unit 30 indirectly by way of the setting of the burner output Lb and the blower output Lk. The burner output Lb is controlled here by the control unit 30 by activation of the gas valve 22. By contrast, the blower output Lk is controlled by the control unit 30 by activation of the blower 23.

Figure 2:
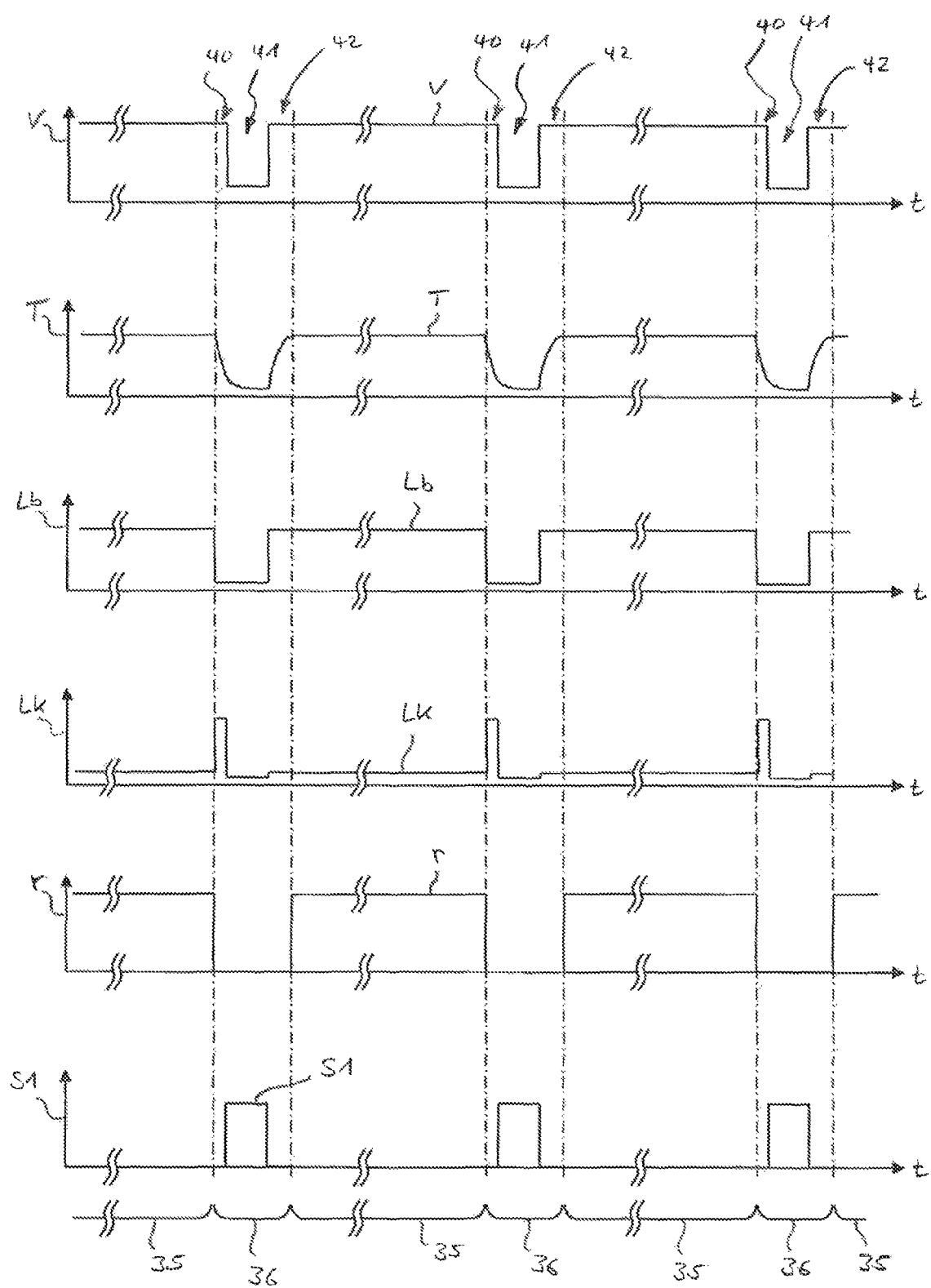
FIG. 2 shows in six synchronous diagrams arranged one above the other the sequence over time of a method carried out by means of the installation according to FIG. 1 for producing hollow microbeads on the basis of six operating parameters of the installation, to be specific (from the top downward) on the basis of the flow velocity of the gas flow within the firing chamber, the temperature of this gas flow, the burner output, the blower output of a cold-gas blower, the charging rate at which the microparticles are introduced into the firing chamber and the position of a reject valve, which is arranged downstream of an outlet opening arranged in the bottom of the firing chamber.

The method automatically carried out by the control unit 30 running the control program 32 is represented in FIG. 2 on the basis of the variation over time of the flow velocity v, the temperature T, the burner output Lb, the blower output Lk and the charging rate r. Also represented in FIG. 2 is the variation over time of the valve position S1 of the reject valve 11 activated by the control unit 30. In this representation, the valve position S1 assumes a positive value, other than zero, when the reject valve 11 is open, while the valve position S1 assumes the value zero when the reject valve 11 is closed.

It can be seen from the representation that the installation 1 is not in continuous operation in the course of the method. Rather, the operation of the installation 1 according to the method is distinguished by a regular alternation over time of operating phases 35 and charging breaks 36. The operating phases 35 have a much greater time duration here than the charging breaks 36. Thus, in an example of how the method is carried out, the operating phases 35 have a duration of in each case 20 minutes, while the charging breaks 36 have in each case a time duration of 30 seconds.

In each of the operating phases 35, hollow microbeads 2 are produced by means of the installation 1 in the way described above. Correspondingly, the charging rate r in the operating phases 35 always has a positive value. In the operating phases 35, the gas flow H is steadily produced with an approximately constant flow velocity v and approximately constant temperature T between approximately 1400° C. and 1900° C. by firing the firing chamber 5 while admixing a comparatively small amount of cold gas K. Consequently, the operating phases 35 are distinguished by a comparatively high burner output Lb and comparatively low blower output Lk. Moreover, the reject valve 11 is always kept closed in the operating phases 35.

With the beginning of each charging break 36, the charging of the firing chamber 5 with the microparticles 26 is suspended by the control unit 30 by corresponding activation of the actuating unit 29. Correspondingly, the charging rate r returns to the value zero. At the same time, the burner 20 is switched by the control unit 30 to a standby mode, in that the control unit 30 lowers the burner output Lb to a small value by corresponding activation of the gas valve 22.

In a cooling-down phase 40, of for example approximately 5 sec, at the beginning of each charging break 36, the flow velocity v prevailing in the firing chamber 5 is at least approximately maintained by increased blowing in of cold gas K. The reduction in the burner output Lb is consequently compensated by a temporary increase in the blower output Lk. As a result, in the cooling-down phase 40 on the one hand the (non-expanded or partly expanded) microparticles 26 still remaining in the firing chamber 5 are kept in suspension. On the other hand, the microparticles 26 are cooled down abruptly to below 800° C. by the increased blowing in of cold gas K (which can be seen in FIG. 2 from the drop in the temperature T), whereby the sticking of the microparticles 26 to one another and to the inside wall 6 of the vertical furnace 3 is avoided or at least reduced.

After the cooling-down phase 40, in an emptying phase 41 on the one hand the blower output Lk is also lowered by the control unit 30 (with the still lowered burner output Lb), whereby the flow velocity v in the firing chamber 5 drops sharply. At the same time, the reject valve 11 is opened by the control unit 30, which is manifested in the representation according to FIG. 2 by the value of the valve position S1 jumping from zero to one.

Due to the interruption in the gas flow H, the microparticles 26 remaining in the firing chamber 5 sink to the bottom 8 of the vertical furnace 3 and fall from there through the outlet opening 9 and the reject line 10 into the reject reservoir 12. If it is not possible for these microparticles 26 to be transported in the reject line 10 by gravitational force alone, suitable transporting means are provided in the reject line 10, for example a feed screw or a blower, with which the microparticles 26 withdrawn from the firing chamber 5 are actively transported into the reject reservoir 12.

After the emptying phase 41—lasting for example 15 seconds—the valve 11 is closed again by the control unit 30, whereby the valve position S1 jumps back again to the value zero. Subsequently, in a heating-up phase 42 lasting for example for 10 seconds, the burner output Lb and the blower output Lk are raised by the control unit 30 to their values typical for the operating phase 35, whereby on the one hand the flow velocity v of the gas flow H assumes its operating value and on the other hand the temperature T of the gas flow H also increases again After the heating-up phase 42, the next operating phase 35 is started by the control unit 30, in that the control unit 30 starts renewed charging of the firing chamber 5 by corresponding activation of the actuating unit 29. The method steps described above are cyclically repeated.

Figure 3:
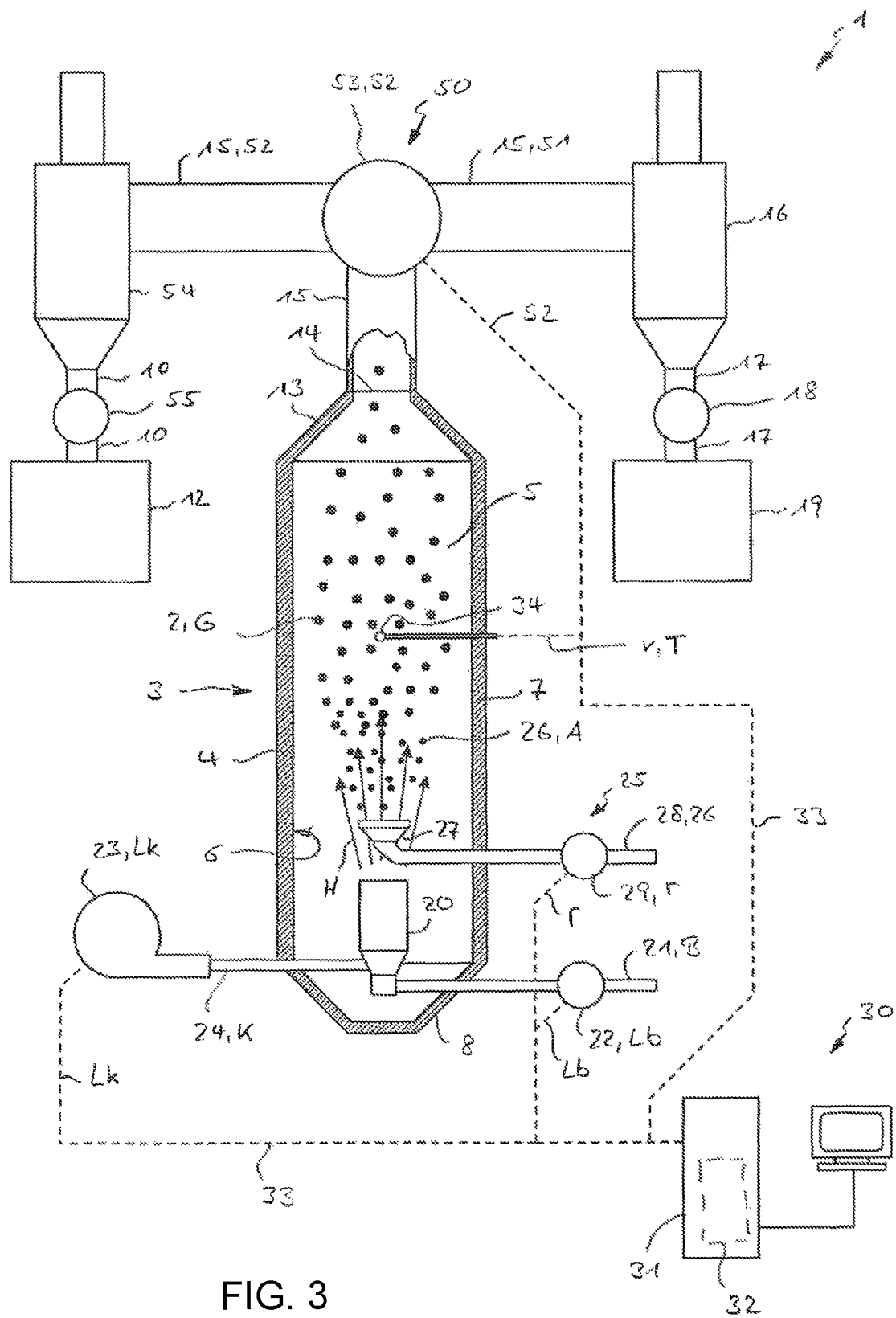
FIG. 3 shows in a representation according to FIG. 1 an alternative configuration of the installation there.

FIG. 3 shows an alternative embodiment of the installation 1. Apart from the differences described below, this embodiment corresponds to the installation 1 shown in FIG. 1. As a difference from the embodiment there, in the case of the installation 1 according to FIG. 3 however there is no outlet opening 9 in the bottom 8 of the vertical furnace 3. Instead, provided in the flue duct 15 in the case of the installation 1 according to FIG. 3 is a branching 50, by which the flue duct 15 is divided into a product branch 51 and a reject branch 52. The three-way valve 53, which is provided at the branching 50 and is activated by the control unit 30 by way of the fieldbus 33, allows the gas outlet 14 to be connected in a reversibly switchable manner either to the product branch 51 or to the reject branch 52 of the flue duct 15.

While—as in the case of the embodiment according to FIG. 1—the product branch 51 opens out into the solids separator 16 intended for separating the hollow microbeads 2, the reject branch 52 opens out into a second solids separator 54. This solids separator 54 is preferably likewise formed by a cyclone separator, which is in particular structurally identical to the solids separator 16. On its underside, the solids separator 54 opens out into the reject line 10, which—as in the case of the exemplary embodiment according to FIG. 1—is connected to the reject reservoir 12. Instead of the reject valve 11, provided in the reject line 10 in the case of the exemplary embodiment according to FIG. 3 however is a modified reject valve 55, which closes off the solids separator 54 from the environment in a pressure-tight manner, though allowing the microparticles 26 withdrawn from the firing chamber 5 to pass through. In a way similar to the case of the product valve 18, the reject valve 55 is formed for example by a double swing valve or a rotary feeder. The reject valve 55 here is formed in particular as structurally identical to the product valve 18.

Figure 4:
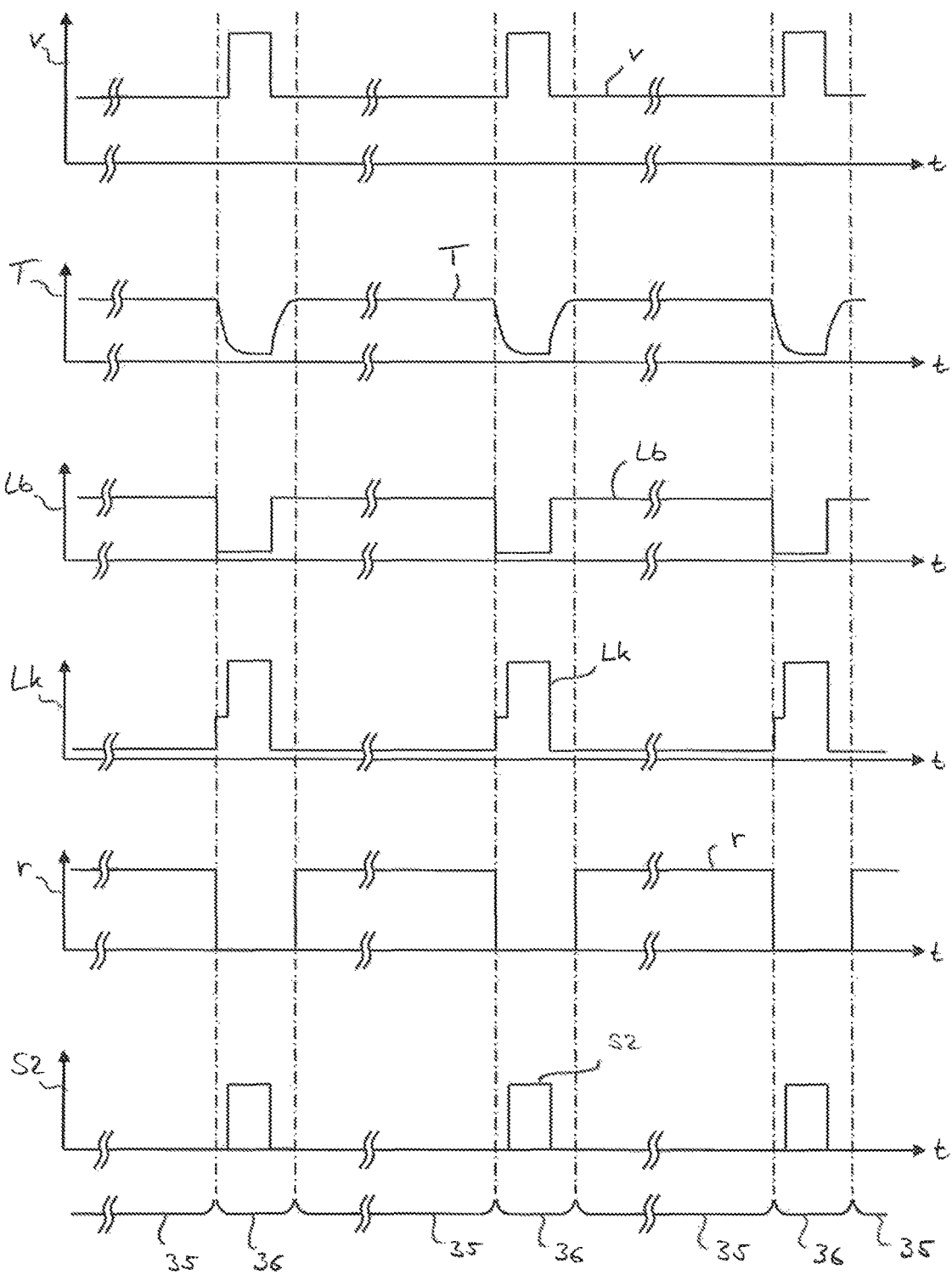
FIG. 4 shows in a representation according to FIG. 2 the sequence of the method carried out by means of the installation according to FIG. 3 on the basis of once again six parameters of this installation, to be specific (from the top downward) on the basis of the flow velocity of the gas flow in the firing chamber, the temperature of this gas flow, the burner output, the blower output of a cold-gas blower, the charging rate and the position of a three-way valve arranged in a flue duct of the firing chamber.

The sequence of the method carried out with the installation according to FIG. 3 for producing the hollow microbeads 2 is represented in FIG. 4. This representation corresponds to the representation according to FIG. 2, although a valve position S2 of the three-way valve 53 is indicated instead of the valve position S1. The valve position S2 here assumes a positive value, other than zero, when the reject branch 52 is connected to the gas outlet 14 of the vertical furnace 3 by the three-way valve 53. If, on the other hand, the product branch 51 of the flue duct 15 is connected to the gas outlet 14, the valve position S2 in the representation according to FIG. 4 has the value zero.

Except as otherwise described below—the method carried out by way of the installation 1 according to FIG. 3 is identical to the method described on the basis of FIG. 2. In particular, also in the case of the installation according to FIG. 3, the charging of the firing chamber 5 with the microparticles 26 is suspended by the control unit 30 during the charging breaks 36 (r=0) and, after the initial cooling-down phase 40, the burner output Lb is lowered.

However—as a difference from the method according to FIG. 2—during the emptying phase 41 the lowered burner output Lb is overcompensated by a further increase in the blower output Lk. This causes a sharp rise in the flow velocity v in the firing chamber 5 during the emptying phase 41, whereby the non-expanded or only partly expanded microparticles 26 that remained in the firing chamber 5 at the completion of the preceding operating phase 35 are also blown out upwardly through the gas outlet 14.

In order to prevent this rejected matter being separated together with the properly expanded hollow microbeads 2 in the solids separator 16, the control unit 30 switches over the three-way valve 53 at the beginning of the emptying phase 41, so that the gas outlet 14 is connected to the reject branch 52. In the representation according to FIG. 4, this can be seen by the value of the valve position S2 assuming a value other than zero.

The microparticles 26 discharged out of the firing chamber 5 during the emptying phase 41 are consequently separated in the solids separator 54 and in turn pass by way of the reject line 10 into the reject reservoir 12.

Figure 5:
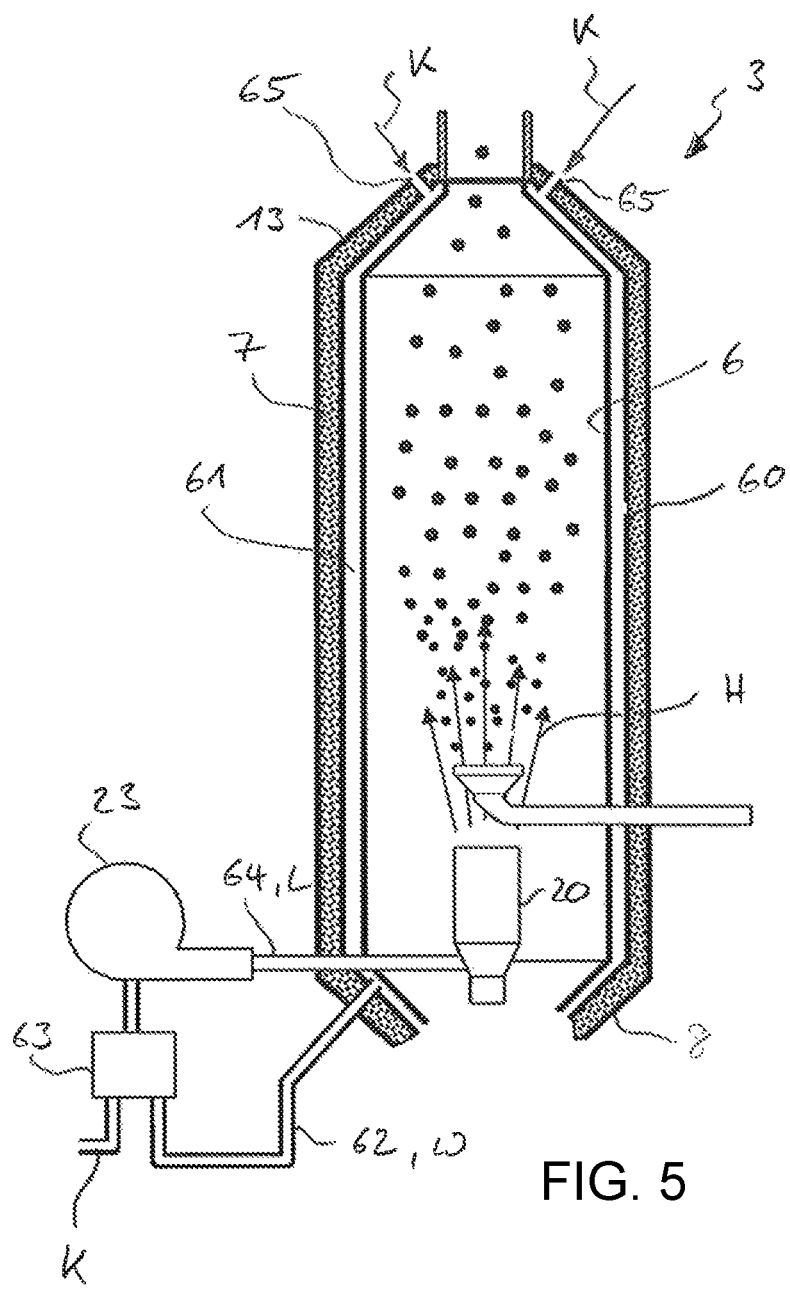
FIG. 5 shows in a representation according to FIG. 1 a variant of the shaft furnace according to FIG. 1 or FIG. 3 with a double-wall furnace shell in the form of a detail.

FIG. 5 shows a variant of the vertical furnace 3 in the form of a detail, in which the shell 4 is formed with a double wall. The shell 4 comprises here in addition to the inside wall 6 an outside wall 60 of steel, which surrounds the inside wall 6 at a distance. The insulation 7 is provided here on the outside of the outside wall 60. The inside wall 6 does not bear any insulation.

The inside wall 6 is formed by a shell that is welded, and consequently of one piece in the finished state. By contrast, the outside wall 60 is preferably made up of three parts, to be specific a boiler head (in particular a standard part as used conventionally for boilers or storage tanks), which forms the dome 13, and also two half-shells, which respectively form one half of the middle region and the bottom 8. These three parts are screwed to one another or reversibly joined together in some other way, in order to be able to dismantle the vertical furnace 3 easily for maintenance and repair purposes. The vertical separation of the outside wall 60 into the two half-shells advantageously makes it possible here—by removing at least one half-shell—to have good accessibility to the inside wall 6, without the vertical furnace 3 having to be completely dismantled for this.

In order to make stress-free thermal expansion of the inside wall 6 possible, the inside wall 6 is exclusively suspended from the boiler head, that is to say the dome region of the outside wall 60, and is not otherwise in contact with any other rigid part of the installation 1. In this case, the suspension of the inside wall 6 on the outside wall 60 is also expediently configured in a flexible manner, so that a radial movement of the inside wall 6 with respect to the outside wall 60 is made possible.

Formed between the inside wall 6 and the outside wall 60 is an air gap—annular in horizontal section through the vertical furnace 3—which is referred to as a shell interspace 61 and the thickness of which (measured in each case perpendicularly to the inside wall 6) is for example about 20 to 30 cm. At its lower periphery, the shell interspace 61 is closed off by a temperature-resistant and flexible seal (not explicitly represented).

The double-wall shell 4 is used for cooling the inside wall 6. For this purpose, the lower region of the shell interspace 61 is connected by way of a warm-air line 62 to a mixer 63, into which the cold-gas line 24 opens out on the other side. On the output side, the mixer 63 is connected to the burner 20 by way of an air line 64. In the mixer 63, the cold gas K fed in by way of the cold-gas line 24 is mixed with the warm air W, fed in by way of the warm-air line 62, in a ratio that can be variably set.

In the operation of the vertical furnace 3, cold air is introduced—by means of a not explicitly represented blower, for example a rotary blower—by way of an air line 65 in a volumetrically metered manner and under positive pressure into an upper region of the shell interspace 61. On account of the positive pressure, the heated warm air W escapes from the lower region of the shell interspace 61 by way of the warm-air line 62. The air circulation consequently produced in the shell interspace 61 has the effect that the inside wall 6 of the shell 4 is cooled in countercurrent in relation to the gas flow H.

In the case of the variant of the vertical furnace 3 according to FIG. 5, the temperature of the air L fed to the burner 20 is set by the mixer 63. As a result, the temperature T of the gas flow H in the firing chamber 5 is also indirectly influenced.

The double-wall shell 4 and cooling-air ducting described above may be provided both in the case of the installation 1 according to FIG. 1 and in the case of the installation 1 according to FIG. 3. The bottom 8, of different designs in FIGS. 1 and 3, of the firing furnace 3 is therefore only partially represented in FIG. 5.

The invention becomes particularly clear from the exemplary embodiments described above, but is nonetheless not restricted to these exemplary embodiments. Rather, further embodiments of the invention can be derived from the claims and the foregoing description.

The following is a summary list of reference numerals and the corresponding structure used in the above description of the invention:
- 1 Installation
- 2 Hollow microbeads
- 3 Vertical furnace
- 4 (Furnace) shell
- 5 Firing chamber
- 6 Inside wall
- 7 Insulation
- 8 Bottom
- 9 Outlet opening
- 10 Reject line
- 11 Reject valve
- 12 Reject reservoir
- 13 Dome
- 14 Gas outlet
- 15 Flue duct
- 16 Solids separator
- 17 Product line
- 18 Product valve
- 19 Product reservoir
- 20 Burner
- 21 Combustible-gas line
- 22 Gas valve
- 23 (Cold-gas) blower
- 24 Cold-gas line
- 25 Charging device
- 26 Microparticles
- 27 Output head
- 28 Supply line
- 29 Actuating unit
- 30 Control unit
- 31 Control computer
- 32 Control program
- 33 Fieldbus
- 34 Sensor unit
- 35 Operating phase
- 36 Charging break
- 40 Cooling-down phase
- 41 Emptying phase
- 42 Heating-up phase
- 50 Branching
- 51 Product branch
- 52 Reject branch
- 53 Three-way valve
- 54 Solids separator
- 55 Reject valve
- 60 Outside wall
- 61 Shell interspace
- 62 Warm-air line
- 63 Mixer
- 64 Air line
- 65 Air line
- r Charging rate
- t Time
- v Flow velocity
- A Starting glass material
- B Combustible gas
- G Glass
- H Gas flow
- K Cold gas
- L Air
- Lb Burner output
- Lk Blower output
- S1 Valve position
- S2 Valve position
- T Temperature
- W Warm air

The invention claimed is:

1. A method for producing hollow microbeads of glass, the method comprising:
   during each of a plurality of operating phases:
      producing an upwardly directed hot gas flow in a vertical furnace by firing in a firing chamber of the vertical furnace;
      continuously charging the firing chamber with microparticles of a starting glass material;
      expanding the microparticles in the hot gas flow to form the hollow microbeads; and
      discharging expanded hollow microbeads out of the firing chamber with the gas flow through a gas outlet at an upper end of the vertical furnace; and
   setting a duration of the operating phases so that the discharging of the firing chamber takes place before operation of the vertical furnace is significantly impaired by the microparticles collecting therein;
   providing a charging break between mutually successive operating phases, and during the charging break:
      suspending the charging of the microparticles into the firing chamber; and
      removing the microparticles remaining in the firing chamber from the firing chamber.

2. The method according to claim 1, which comprises:
   during each charging break, reducing the gas flow to allow the microparticles remaining in the firing chamber to sink to a bottom of the firing chamber; and
   removing the microparticles from the firing chamber through an outlet opening provided in the bottom of the firing chamber.

3. The method according to claim 2, which comprises reducing a temperature of the gas flow during the charging breaks prior to reducing the gas flow by introducing cold gas.

4. The method according to claim 1, which comprises:
   during each charging break, increasing the gas flow by blowing cold gas into the firing chamber, to blow the microparticles remaining in the firing chamber out from the firing chamber by way of the gas outlet at the upper end of the vertical furnace.

5. The method according to claim 4, which comprises reducing a temperature of the gas flow during the charging breaks prior to increasing the gas flow by introducing cold gas.

6. The method according to claim 1, which comprises performing operating phases and charging breaks following one another in a regular cycle over time.

7. The method according to claim 1, wherein the operating phases have a uniform duration, which exceeds a duration of the charging breaks.

8. The method according to claim 1, which comprises setting a duration of each charging break to between 5 seconds and 60 seconds.

9. An installation for producing hollow microbeads of glass, the installation comprising:
- a vertical furnace having a firing chamber with a gas outlet formed at an upper end thereof;
- a burner disposed in said firing chamber and configured to produce an upwardly directed hot gas flow in said firing chamber;
- a charging device for charging said firing chamber with microparticles of a starting glass material, whereupon the microparticles are expanded in the hot gas flow into the hollow microbeads, and the microbeads are discharged out of the firing chamber with the gas flow through the gas outlet; and
- a control unit configured to automatically carry out the method according to claim 1.

10. The installation according to claim 9, which comprises an outlet opening at a bottom of the firing chamber for removing microparticles remaining in said firing chamber.

11. The method according to claim 1, which comprises carrying out the operating phases with a duration of each operating phase between 4 minutes and 30 minutes.

12. A method for producing hollow microbeads of glass, the method comprising:
- during each of a plurality of operating phases:
  - producing an upwardly directed hot gas flow in a vertical furnace by firing in a firing chamber of the vertical furnace;
  - continuously charging the firing chamber with microparticles of a starting glass material;
  - expanding the microparticles in the hot gas flow to form the hollow microbeads; and
  - discharging expanded hollow microbeads out of the firing chamber with the gas flow through a gas outlet at an upper end of the vertical furnace; and
- carrying out the operating phases with a duration of each operating phase between 4 minutes and 30 minutes;
- providing a charging break between mutually successive operating phases, and during the charging break:
  - suspending the charging of the microparticles into the firing chamber; and
- removing the microparticles remaining in the firing chamber from the firing chamber.

* * * * *